United States Patent [19]
Hooker et al.

[11] Patent Number: 5,644,141
[45] Date of Patent: Jul. 1, 1997

[54] APPARATUS AND METHOD FOR HIGH-SPEED CHARACTERIZATION OF SURFACES

[75] Inventors: Jeffery A. Hooker, Melbourne Beach; Stephen M. Simmons, Titusville, both of Fla.

[73] Assignee: The United States of America as represented by the Administrator of the National Aeronautics and Space Administration, Washington, D.C.

[21] Appl. No.: 542,141

[22] Filed: Oct. 12, 1995

[51] Int. Cl.$^6$ .................................................. G01N 21/86
[52] U.S. Cl. ................................. 250/559.22; 356/376
[58] Field of Search ......................... 250/559.22, 559.48, 250/559.23; 356/376, 377, 380, 431; 359/84, 85, 94, 95, 96

[56] References Cited

U.S. PATENT DOCUMENTS

| | | |
|---|---|---|
| 3,005,916 | 10/1961 | Lentze . |
| 3,096,443 | 7/1963 | Laycak . |
| 3,427,109 | 2/1969 | Beattie et al. . |
| 3,732,430 | 5/1973 | Hujer et al. ............... 250/559.42 |
| 3,797,943 | 3/1974 | Nagao et al. ............... 250/559.42 |
| 3,806,897 | 4/1974 | Buchan et al. ............. 250/225 |
| 4,674,875 | 6/1987 | Koizumi ..................... 250/559.42 |
| 4,686,374 | 8/1987 | Liptay-Wagner et al. .. 250/559.46 |
| 4,849,645 | 7/1989 | Mendenko et al. ........ 250/559.18 |
| 5,024,529 | 6/1991 | Svetkoff et al. ........... 356/376 |
| 5,095,214 | 3/1992 | Eder ........................... 250/559.03 |
| 5,144,151 | 9/1992 | Thorne et al. ............. 250/559.42 |

*Primary Examiner*—Que Le
*Attorney, Agent, or Firm*—Beth A. Vrioni

[57] ABSTRACT

This invention permits rapid determination of a three-dimensional contour of an object. The apparatus directs a laser beam onto a point on an object, and the scattered light is received by a position sensitive detector (PSD). The location at which scattered light is received can be related to the displacement of the point on the object, using basic trigonometry. The laser beam is deflected non-mechanically, by passing it through a crystal whose index of refraction is varied in a controlled manner. By proper control of the index of refraction, one can scan the beam across a desired area of the object, without using any moving parts, and can therefore obtain complete information about the contour of the object. The device operates without making any conventional images, and is therefore much faster than comparable devices of the prior art. Also, the laser and beam deflector can be housed in a small optical head which enables the device to reach normally inaccessible areas. The device can compare the test object with a reference object, or it can compare two objects for differences.

22 Claims, 5 Drawing Sheets

Prior Art

APPARATUS AND METHOD FOR HIGH-SPEED CHARACTERIZATION OF SURFACES

BACKGROUND OF THE INVENTION

This invention relates to the field of optical metrology, and includes an apparatus and method for rapidly and accurately measuring contours of test objects.

Prior art techniques of precisely determining the surface contours of objects have required formation of a conventional image of the object. The image is typically acquired by a video camera, digitized, and stored in a computer memory as a set of pixels. The computer then analyzes the image, such as by comparing it, pixel by pixel, with a stored reference image.

The processing of a stored image requires a very large number of calculations. Even with high-speed digital computers, processing a stored image takes a relatively long time, thereby limiting the ability of the system to generate immediate, "real time" results.

The systems of the prior art also have the disadvantage that they occupy relatively large amounts of space. The latter consideration is partly due to the size of the laser and associated optical equipment required. Also, many prior art systems for analyzing an object require that the object be moved relative to the source of laser light. Providing a moving platform for the object inherently increases the overall size of the system.

The present invention solves the problems described above, by providing a high-speed method and apparatus for analyzing the contour of a test object. The present invention does not use conventional image processing techniques; in fact, no image of the object is ever obtained or stored. The components used in the apparatus can be configured within a small optical head which can scan areas normally inaccessible to larger, conventional testing devices.

SUMMARY OF THE INVENTION

The apparatus of the present invention includes a source of radiation, directed towards a test object, and a position-sensitive detector (PSD) arranged to receive radiation scattered from the object. An acousto-optic beam deflector (AOBD) sits between the radiation source and the object. The AOBD comprises a piezoelectric crystal which vibrates when excited by radio-frequency (RF) energy. The vibration of the crystal generates regions of variation in refractive index, the spacing of such regions depending on the frequency of vibration. Thus, a beam of radiation passing through the crystal will be bent in proportion to the frequency of the RF energy applied. A computer turns the RF source on and off, and controls its frequency, thereby causing the beam to scan an entire area of interest. For each point that is scanned by the beam, the computer interprets the output of the PSD, and uses basic trigonometry to calculate a relative displacement of the point. The result is a set of numbers comprising a very precise representation of the contour of the object.

The invention also includes feedback means, connected between the output of the PSD and the laser, for modulating the power of the laser in accordance with the intensity of the signal obtained from the PSD. Thus, the system automatically maintains the power output of the laser so as to keep the output of amplifiers connected to the PSD in the most linear region, as well as to maintain a high signal-to-noise ratio.

The invention also includes a method for analyzing the contour of a surface of an object. According to this method, a beam of radiation is successively directed, by non-mechanical means, towards a plurality of points on the object. Each such point scatters the beam onto a particular location on a PSD. The location of the scattered beam, on the PSD, can be determined by measuring currents induced photoelectrically in the PSD, and this location can be related, by trigonometric calculations, to the displacement of the point on the object, relative to a reference position. By repeatedly moving the beam to various points on the object, while each time determining the displacement of the points, one can generate a complete surface contour map of the object. Such map is generated without ever producing a conventional image of the object.

The present invention therefore has the primary object of providing a method and apparatus for analyzing the contour of a surface.

The invention has the further object of increasing the speed at which a surface contour can be mapped.

The invention has the further object of enabling a surface contour to be mapped with a very small optical head, wherein the head can fit into spaces that would be inaccessible to optical heads of the prior art.

The invention has the further object of providing an apparatus and method for scanning an article using non-mechanical means to deflect a beam of radiation.

The reader skilled in the art will recognize other objects and advantages of the present invention, from a reading of the brief description of the drawings, the detailed description of the invention, and the appended claims.

DETAILED DESCRIPTION OF THE INVENTION

The present invention uses a position sensitive detector (PSD) to obtain detailed information about the contour of a test object, without the need to form a conventional image. A PSD, which itself is part of the prior art, is essentially a photoelectric cell made of a semiconductor material. More specifically, a PSD is a lateral photodetector comprising p-type and n-type doped layers that are ion-implanted on either side of a slice of silicon. In the case of a one-dimensional PSD, electrical contacts are made on opposite ends of the p-type layer. In the case of a two-dimensional PSD, contacts are made on the p-side for measurement in one direction and on the n-side, rotated by 90°, for measurements in the other direction. The ion-implanted p-type and n-type layers are extremely homogeneous in resistivity.

The PSDs used in the present invention can be obtained from On-Trak Photonics, of Lake Forest, Calif. The two-dimensional PSD used in the example described below had the model number 2L10SP. The invention is not limited to use with the above-identified equipment.

An incident light spot on the a generates an electric current that travels outward from the centroid of the energy distribution of the spot. The magnitude of the current observed at each electrode varies directly with the negative of the distance between the electrode and the light spot, due to the homogeneity of the resistivity of the p-type and n-type layers. Thus, if the light spot is adjacent to the electrode, the current observed at the electrode is at a maximum, and if the light spot is at the extreme opposite end of the silicon chip from the electrode, the observed current will be at a minimum. If I1 and I2 represent the currents observed at the electrodes on opposite sides of the detector, then I1–I2 provides a direct measurement of the location of the light spot on the detector. By forming the quotient $$I=(I1-I2)/(I1+I2)$$

one can compensate for variations in light spot intensity. The parameter I is essentially independent of the intensity of the light spot, and because the PSD senses the centroid of the energy distribution of the spot, the value of I is largely independent of the size of the spot. PSDs that are commercially available maintain a high degree of linearity over most of their active regions, and can detect displacements of the light spot, along the detector, as small as $10^{-8}$ m.

Figure 1:
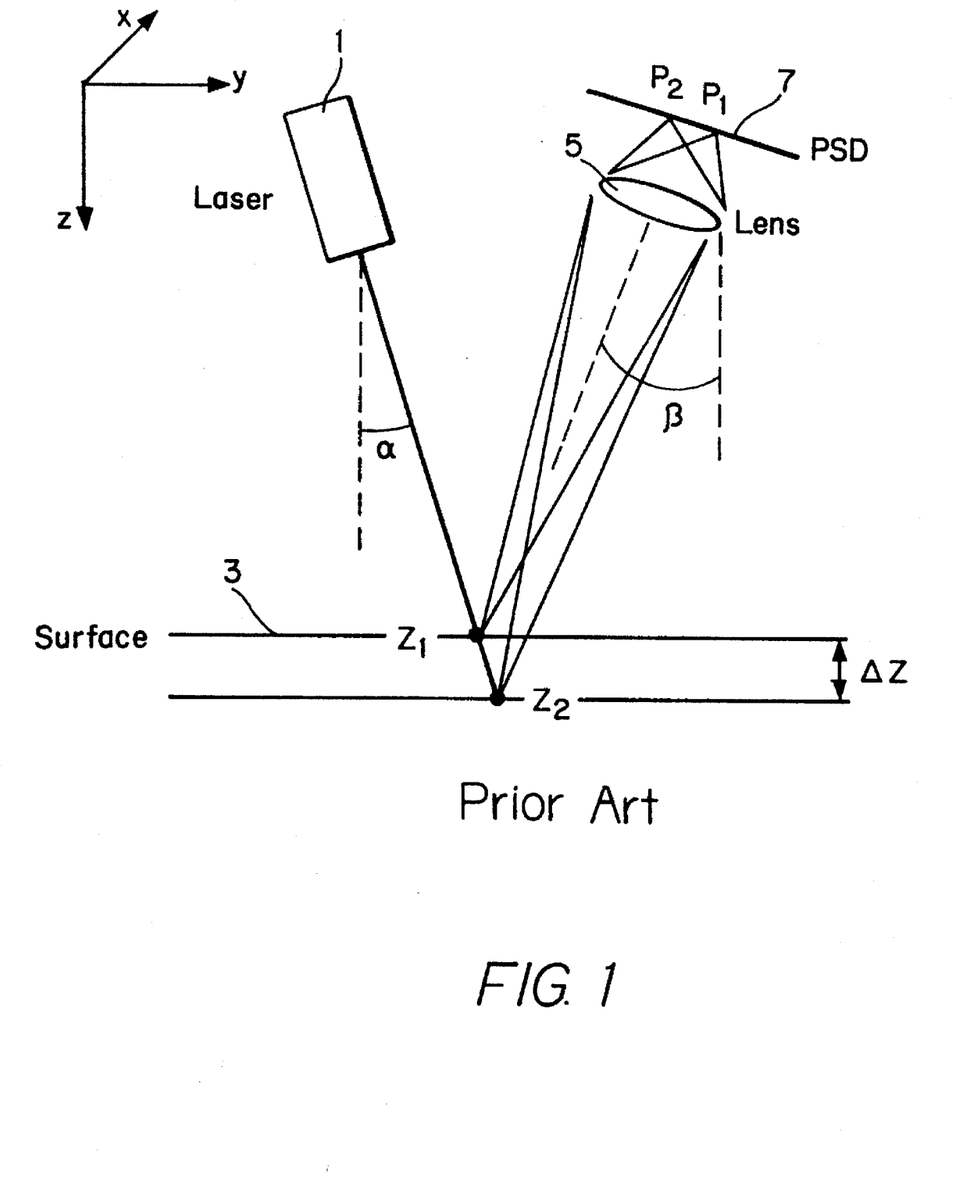
FIG. 1 provides a schematic diagram showing the use of a position sensitive detector in measuring the contour of an object, according to the methods of the prior art.

FIG. 1 shows a schematic diagram which illustrates the general principles underlying the use of a PSD to measure surface contours. Because it does not include an automatic, non-mechanical means of deflecting the laser beam, FIG. 1 has been labeled "prior art". However, the principles represented by FIG. 1, and described below, apply to the present invention.

In FIG. 1, a laser beam from laser 1 is projected at angle α, with respect to the perpendicular to the surface 3 being examined. The laser beam produces a light spot on the surface, at point $Z_1$. The light scattered from point $Z_1$ is collected by an optical system comprising lens 5 and position sensitive detector (PSD) 7. Light scattered from point $Z_1$ enters the optical system at angle β, measured from the perpendicular to the surface, and is focused onto the PSD at point $P_1$.

If the surface is displaced, towards or away from the PSD system, by a distance ΔZ, the laser beam forms a light spot at point $Z_2$, and the scattered beam is focused onto the PSD at point $P_2$. By simple trigonometry, the translation of the scattered laser spot along the PSD can be related to the amount of displacement ΔZ of the surface. The projection and viewing angles α and β are arbitrary, and can be chosen to maximize the resolution of the system within operational constraints.

FIG. 1 shows that if the PSD is fixed, and the object being examined is moved in the x-y plane, i.e. in the plane perpendicular to the displacement ΔZ, the output of the PSD can be used to determine the shape of the surface of the object. For each position of the object, one can calculate a number which represents the displacement ΔZ of the surface. The set of such numbers is equivalent to a map of the contour of the surface. Thus, a complete image of the surface can be generated, provided that the object is moved in a manner such that a sufficient number of points, in the area of interest, are exposed to the laser beam.

Commercially available systems operate on the principle discussed above. However, such systems are limited to use with objects which can be placed on a computer-controlled x-y translation stage, under the position sensor. Although such systems exhibit very high depth resolution on the surface, of the order of $10^{-8}$ m, they are not capable of performing measurements in the field, such as in measuring critical flight surfaces of aircraft. Nor can they inspect areas of difficult or limited access, due to the relatively large volume required by these systems.

To improve the utility of the prior art arrangement of FIG. 1, it is therefore necessary to keep the object stationary, while moving the laser beam. Prior art techniques exist for scanning a laser beam across a surface. Such techniques include using electrically controlled mirrors, which move the laser beam to a desired point on the surface being examined. But mirrors are relatively bulky, and difficult to use, and cannot be moved with the necessary speed and accuracy to exploit fully the speed and spatial resolution of a PSD. It is desired that the positioning of the beam be exactly repeatable from one test to the next. A mechanically-movable device is not likely to achieve this goal.

The present invention therefore uses a non-mechanical means to deflect the laser beam across the surface of interest. In the preferred embodiment, the non-mechanical means for deflecting the beam is an acousto-optic beam deflector (AOBD). An AOBD is a device which includes a crystal whose index of refraction can be precisely varied. Typically, an AOBD comprises a $TeO_2$ crystal, when the radiation to be deflected is visible light. Attached to one end of the crystal is a piezoelectric transducer, which vibrates (i.e. expands and contracts) when a radio-frequency (RF) voltage is applied to it. This vibration is mechanically coupled to the crystal, inducing an acoustic wave in the crystal. As the acoustic wave propagates through the crystal, it creates periodic areas of compression and rarefaction, the spacing of these areas being related to the period of the incident acoustic wave. This periodic change in crystal density causes a periodic change in the index of refraction of the crystal. The beam behaves exactly as though it has passed through a diffraction grating. Part of the beam passes straight through the crystal, without deflection, but another part of the beam is deflected at some angle relative to the direction of propagation of the acoustic wave. The magnitude of the angle of deflection is a function of the spacing of the compressions and rarefactions. The angle of deflection is thus a function of the frequency of the voltage applied to the piezoelectric transducer. The higher the frequency, the closer the spacing of the periodic changes in index of refraction, and the greater the deflection of the beam. Therefore, by providing a control signal having a frequency which varies across a range, in a controlled manner, one can cause the laser beam to scan the object of interest, without the use of a mechanically-movable device. By using two such AOBDs with the directions of acoustic propagation rotated by 90°, one can make a very compact, repeatable and high-speed two-dimensional laser scanner, with no moving parts.

An AOBD is itself part of the prior art. The AOBDs used in the present invention can be obtained from a company called NEOS, of Melbourne, Fla. The acousto-optic deflector used in the examples described in the invention has the model number N45070-6, and its synthesizer driver (i.e. the signal generator which produces the RF voltage) had the model number N64010-100-2ASDFS. The invention is not limited to use with the above-identified equipment.

Figure 2:
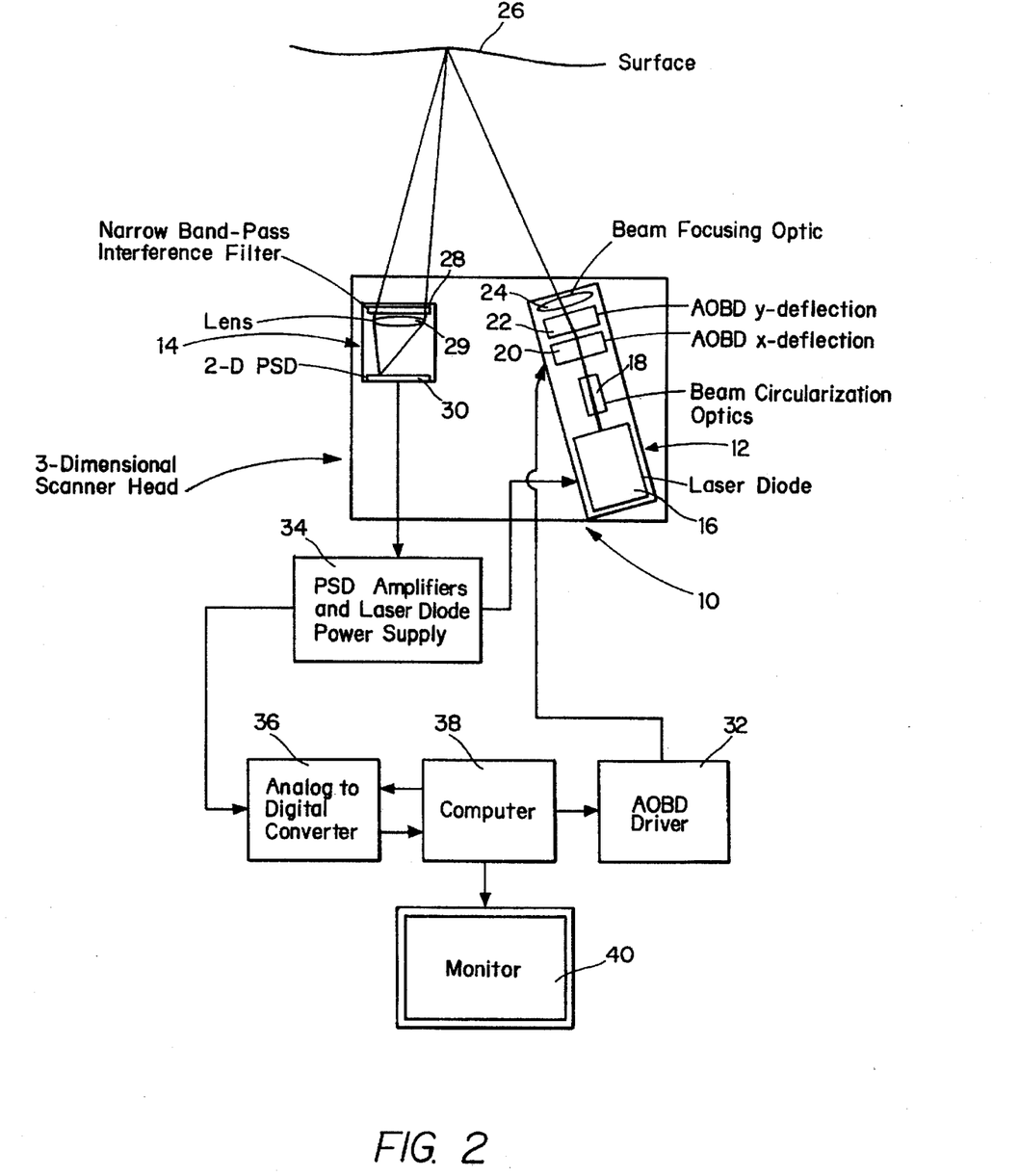
FIG. 2 provides a schematic diagram of the components of an apparatus made according to the present invention.

FIG. 2 shows a schematic and block diagram of one preferred embodiment of the apparatus of the present invention. Optical head 10 includes a beam generation unit 12 and optical system 14. The beam generation unit includes laser diode 16 which forms a laser beam. The beam passes through optical system 18 which preferably includes a pair of prisms which convert the elliptically-shaped beam, produced by the laser diode, into a circular beam. The beam then passes through two AOBDs, 20 and 22, arranged in series. The AOBDs are arranged such their directions of acoustic propagation are mutually orthogonal, so that AOBD 20 provides deflection in the x direction and AOBD 22 provides deflection in the y direction. Lens 24 focuses the beam onto surface 26 of the test object.

The scattered beam enters optical system 14, passes through narrow band-pass interference filter 28, and lens 29, and then impinges on two-dimensional position sensitive detector (PSD) 30. This PSD is of the type known as a duo-lateral PSD, meaning that it has electrodes on different sides, to create a true two-dimensional readout. The purpose of the interference filter is to prevent ambient light from entering the PSD. In one example, the laser diode produces light having a wavelength of 691 nanometers, and the filter is chosen to pass only wavelengths between 689 and 693 nanometers. The latter numbers are used only as examples, and should not be deemed to limit the invention. What is important is that if a filter is used, it should be "tuned" to the wavelength of the light being used.

In the preferred embodiment, the two AOBDs comprise crystals which occupy a volume approximately comparable to that of a cube 1.5 inches on a side. Thus, with the use of a laser diode, together with the AOBDs described, it is possible to make the optical head very small. The signal generator (also known as a synthesizer) that provides an RF signal at a controlled and varying frequency is represented by block 32, and can be physically separated from the crystals by distances of up to about 50 feet.

The output of the PSD is connected to an amplifier, shown in block 34. Block 34 also includes a power supply for the laser diode. The output of the amplifier is connected to analog-to-digital converter 36, which exchanges information with computer 38. One can use monitor 40 to view the results of the analysis.

In the preferred embodiment, the operating characteristics of the AOBDs make it possible to achieve a spot random access time of 13 microseconds, beam position repeatability within 0.01%, and beam deflections of from 6°–10°. With these parameters, one can address a grid consisting of 256×256 positions in approximately 0.85 seconds. These numbers are only examples, and are not intended to limit the scope of the invention.

When the laser beam is projected onto the surface at an angle, the step size of the laser spot across the surface will not be constant for a constant change in angular deflection of the beam, due to the change in beam angle relative to the normal to the surface being scanned. Because of the precision of the AOBDs, the angular deflection of the beam need not be uniform, and the step size of the laser spot across the surface can be easily made constant. Also, distortions of the projected scan area due to the off-normal intersection of the projected scan with the surface may be accounted for. For example, a square projection by the AOBDs will result in a polygon upon intersection of a flat surface at an angle. By knowing the projection angle precisely, this geometric distortion of the scan area may also be corrected in the AOBDs.

In the apparatus of FIG. 2, the laser projection angle, the detector viewing angle, and the scan area and field of view of the detector can all be adjusted, according to the needs of a particular application. Areas as small as a few hundredths of an inch on a side to areas having dimensions of the order of two feet or more may be scanned. Of course, an increase in scan area causes a decrease in depth resolution.

The system of the present invention, as depicted in FIG. 2, operates as follows. The following description is not intended to limit the invention, but only gives an example of a preferred way of practicing the method. The computer starts the scanning process by determining the first position on the test object to be scanned, and sending information on this position to the signal generator 32 which drives the AOBDs. The light scattered from the surface is collected by optical system 14. Specifically, lens 29 focuses the light onto two-dimensional PSD 30. Since each axis has two outputs, one on either side of the chip, there are four output currents. These output currents are fed to block 34, which includes a current-to-voltage converter and an amplifier. The output of block 34 is fed to analog-to-digital (A/D) converter 36, which converts the voltages to digital form, for processing by computer 38. The A/D converter preferably has a resolution capability of 14 or 16 bits, and is capable of sampling at a rate of about 80,000 samples per second. All four outputs of the PSD are sampled simultaneously to reduce any errors caused by movements or vibrations during the sampling interval.

In addition to supplying an input to the A/D converter, the analog circuitry of block 34 is also connected to laser diode 16. Two of the output currents from one axis of the PSD are added together, by analog electronic circuitry. The latter sum represents the total current through the PSD. The summed current is connected to affect the reference voltage of the laser diode power supply. Specifically, the circuit is configured so that if the total current in the PSD increases, the power output of the laser diode decreases. Thus, the laser power can be modulated, in the downward direction, in real time, in order to keep the output of the current-to-voltage and amplification stages in their most linear region of the input to the A/D converter. Modulation of the laser power also maintains a high signal-to-noise ratio.

Figure 3:
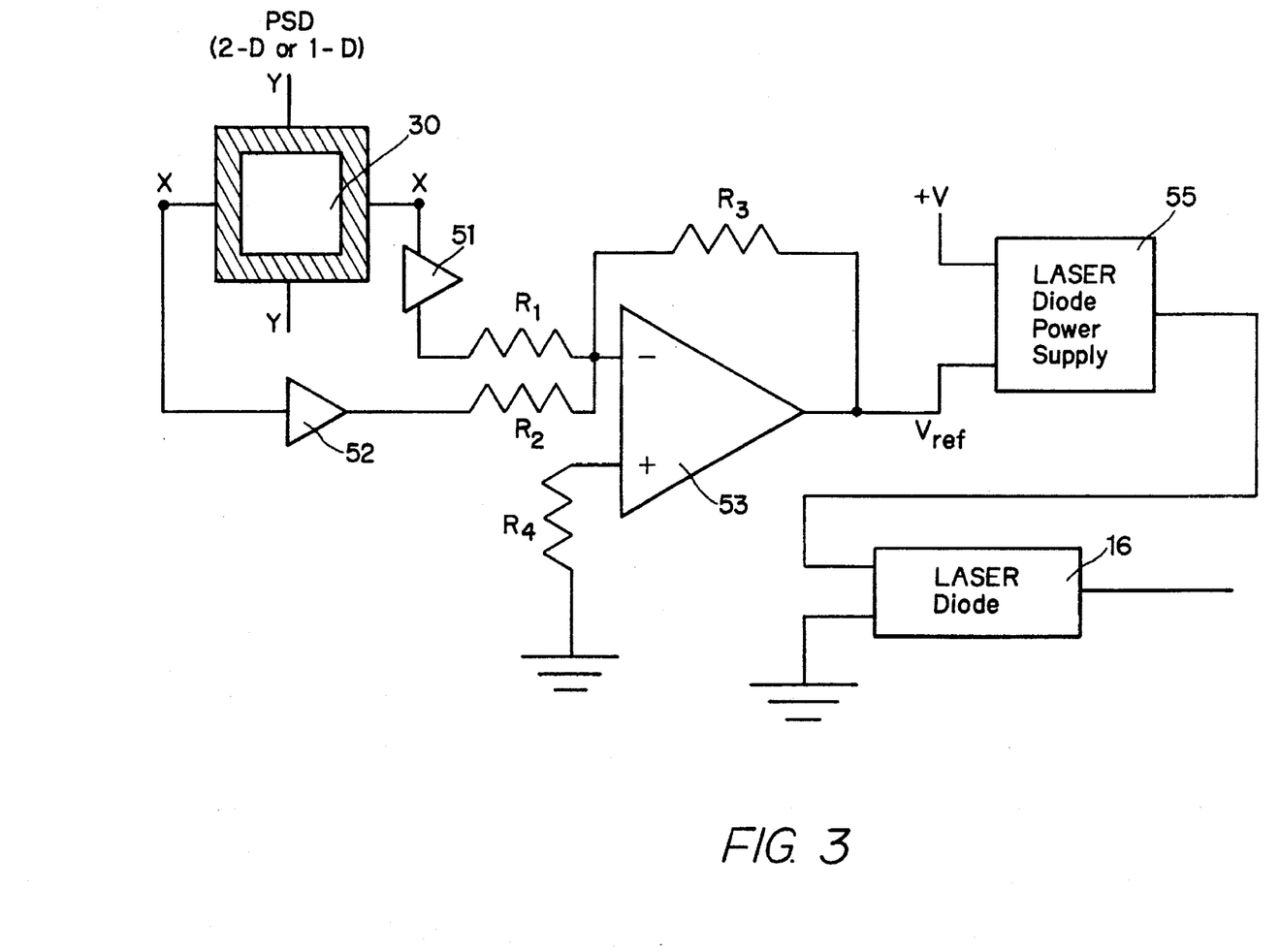
FIG. 3 provides a schematic diagram of a circuit used to modulate the power supply of the laser diode, according to the present invention.

FIG. 3 provides details of the circuitry represented by elements 34 and 16 in FIG. 2. PSD 30 of FIG. 3 (which is the same as PSD 30 in FIG. 2) has a pair of outputs labeled x and a pair of outputs labeled y. These outputs correspond to the two dimensions of the PSD. For purposes of using the output of the PSD to modulate the laser, one can use either the x or the y outputs; it is not necessary to use both. In the example shown, the x outputs are used and the y outputs are not. (Of course, the y outputs are used for determining position information; no connections to the y outputs are shown in FIG. 3 because that figure is concerned only with the modulation of the laser diode.)

In FIG. 3, the x outputs are passed through amplifiers 51 and 52, which convert currents to voltages. These voltages are applied to summing amplifier 53. The values of $R_1$ and $R_2$ are chosen to be substantially equal, so that the output of amplifier 53 will not be weighted in favor of either input signal. Resistor $R_4$ is chosen to be equal to the series combination of $R_3$ and the parallel combination of $R_1$ and $R_2$. This choice of $R_4$ makes the amplifier less temperature sensitive. The voltage at the output of amplifier 53 corresponds to the total current through the PSD. This signal becomes the reference voltage $V_{ref}$ of the laser diode power supply 55, which powers laser diode 16. As $V_{ref}$ increases, the output voltage of the power supply decreases, and the laser power decreases. Thus, the power output of the laser diode varies inversely with the intensity of the light incident on the PSD.

When the analog to digital conversion has been completed, the computer reads the data into memory, performs the calculations described above, and stores the results in memory. The computer then sends, to the AOBD driver, the next position to be scanned, and the process is repeated until the desired area of the object has been scanned.

In the example given above, the minimum scan time for 256×256 positions, based on the above-mentioned sampling rate, is about 0.81 seconds, while the minimum scan time based on the scanning rate of the AOBDs is about 0.85 seconds. Thus, in this example, the minimum scan time is determined by the speed of the AOBDs. The examples given above are not intended to limit the scope of the invention. It may be possible to achieve shorter scan times by using components having different operating parameters. The speed constraints stated above are based on the use of random spot-access times. The process operates more quickly with raster scanning, which is the typical method of scanning.

The data obtained by scanning the surface of the test object are sufficient to describe the surface uniquely, in three dimensions, relative to a baseline calibration. If a surface is to be scanned for defects, and one wants to determine the actual shape of the defects, one can first calibrate the system by scanning a known flat object to create a reference surface. Alternatively, the reference surface could be computer generated. Information defining the reference surface can be stored in computer memory, in the form of a lookup table. A subsequent scan of a test surface is then performed, and the results are compared, point by point, with the reference surface. The differences between the test and reference surfaces are directly converted into a diagram or numerical representation of the precise shape of the test surface. Note that for a given application, the reference surface need only be generated once.

A flat reference surface is required when one does not have prior knowledge of the shape of the test object. But the reference surface can also be completely arbitrary. An arbitrary reference surface allows a comparison between two completely different objects or between a manufacturing standard and a newly manufactured item. For example, if one is testing for sphericity, the reference surface could be part of a perfect sphere of the required radius. If a spherical test surface were then scanned, only the differences in sphericity between the two surfaces would be indicated. If the surfaces were identical, the output of the device of the present invention would be a flat plane.

After the comparisons are made between the reference and test surfaces, the final output of the system may be displayed on monitor 40 and/or printed. The final output, because it has the form of a two-dimensional array of numbers, may also be transferred to most types of spreadsheet programs, which then could be used to manipulate and display the data. The data could also be used to control directly a three-axis numerically controlled mill, enabling the rapid manufacture of three-dimensional machined parts.

When comparing the data for a given test object with a reference object or surface, it is generally desirable that the object and the reference surface be in mutual registration, so that corresponding points can be most easily compared. However, it is possible, and within the scope of the present invention, to compare two arbitrary surfaces that are not in registration. The latter procedure could be accomplishing by generating an "error" function, which comprises the sum of absolute deviations (or squares of deviations) of numbers corresponding to points on the test object and comparable points on the reference object. The error function will be minimized when the test object and reference object are most closely in register. Thus, the error function can be used to place the test object and reference object in virtual registration, and the appropriate comparisons can then be drawn. The latter procedure would be especially useful when it is impossible or inconvenient to move or adjust the test object, such as, for example, when the test object is a component of an aircraft.

Figure 4:
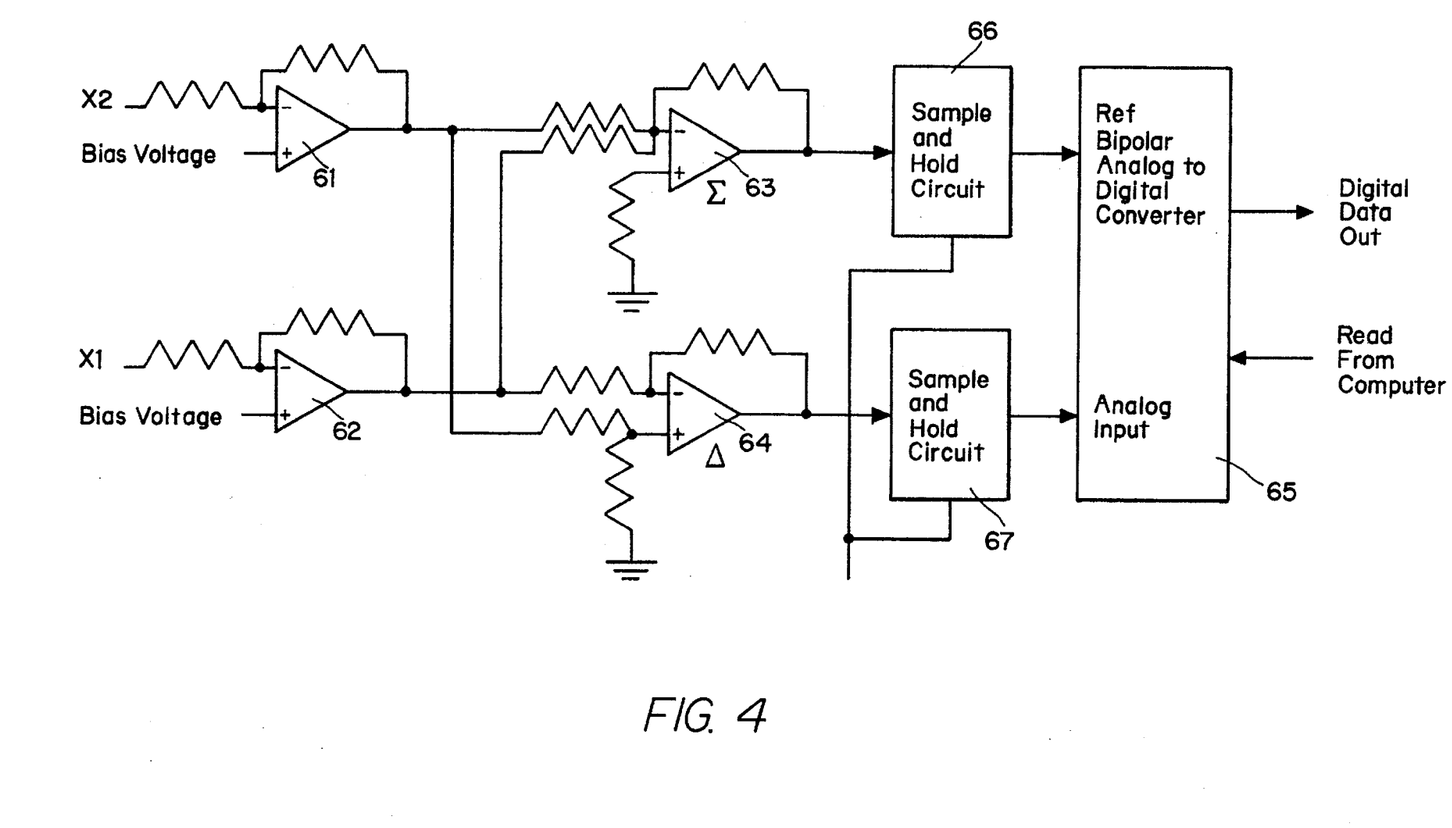
FIG. 4 provides a schematic diagram of a circuit which automatically scales the current signals obtained from the position sensitive detector (PSD), in the present invention.

FIG. 4 shows a circuit which can be used to obtain the quotient (I1−I2)/(I1+I2), discussed above, without performing numerical calculations. The circuit of FIG. 4 takes advantage of the fact that a typical analog-to-digital (A/D) converter, which is commercially available, inherently performs a scaling function. In particular an A/D converter has two inputs, an analog signal input and a reference signal input. The analog signal input is converted to a digital output which comprises a fraction (between 0 and 1) of the reference signal. In FIG. 4, I1−I2 becomes the analog input signal, and I1+I2 becomes the reference signal.

In FIG. 4, the signals x1 and x2 represent current signals from an axis of a PSD. Amplifiers 61 and 62 operate as current to voltage converters. Amplifier 63 produces a signal comprising a voltage which is proportional to the sum of the currents (i.e. I1+I2 in the notation used above), and amplifier 64 produces a voltage proportional to the difference between currents (i.e. I1−I2). Because the reference input of A/D converter 65 must be held reasonably stable to obtain reliable results, it is preferable to use sample and hold circuits 66 and 67. Circuit 66 provides an output that becomes the reference signal for the A/D converter, and circuit 67 provides an output that becomes the actual analog signal that is converted to digital form. It is therefore apparent that the use of the circuit of FIG. 4 eliminates the need for a separate calculation of the above-mentioned quotient.

Figure 5:
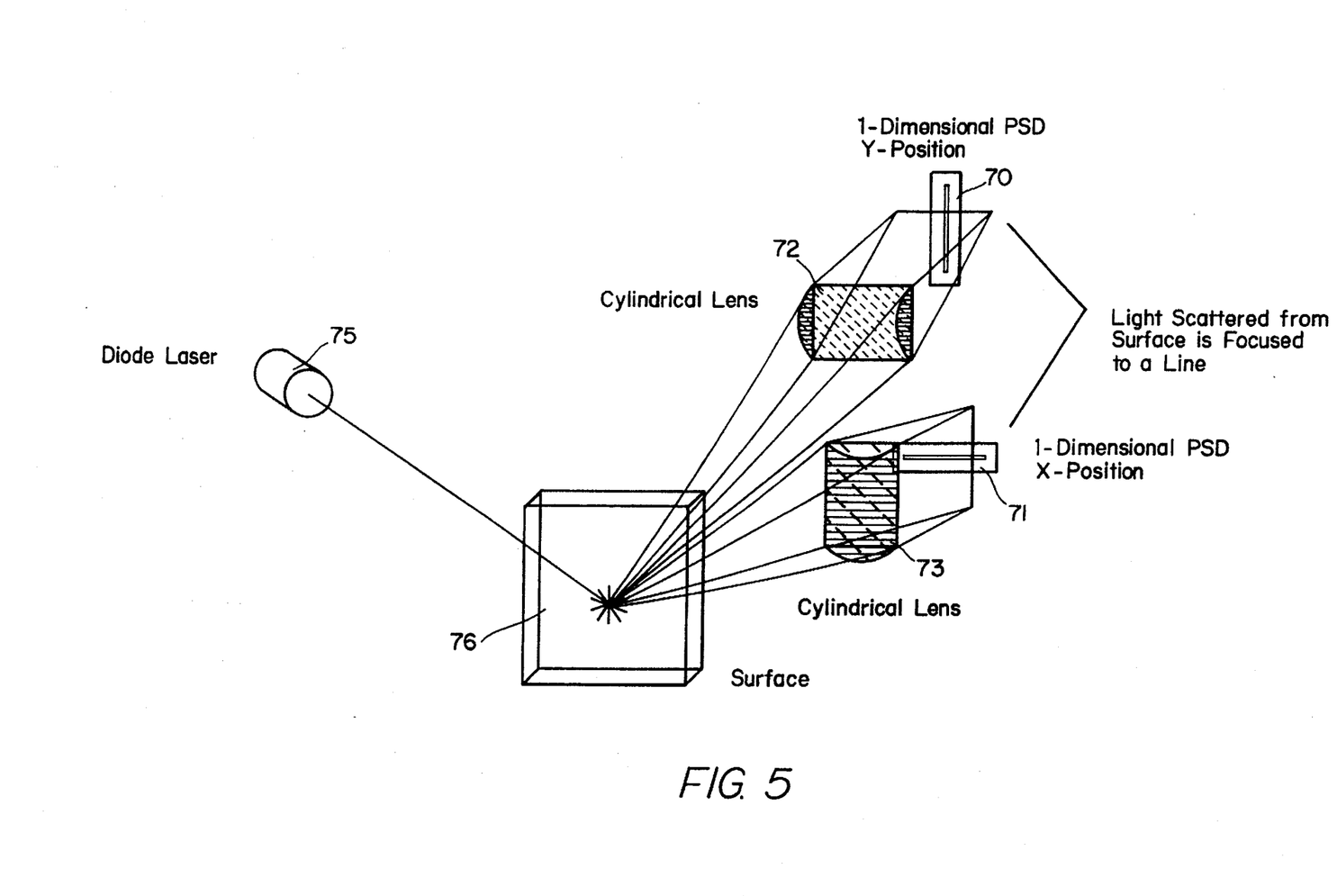
FIG. 5 provides a schematic diagram showing the use of cylindrical lenses and a pair of one-dimensional PSDs, in another embodiment of the present invention.

In the description of FIG. 2, it was noted that the PSD is a two-dimensional device. An alternative approach uses two one-dimensional PSDs instead of one two-dimensional PSD. This arrangement is shown in FIG. 5. Diode laser 75 directs light onto surface 76, which scatters the light towards cylindrical lenses 72, 73, which replace the standard convex lens, such as element 29 of FIG. 2. For clarity of illustration the means for deflecting the beam has been omitted. The two one-dimensional PSDs 70 and 71 are arranged in a mutually perpendicular orientation. For convenience, the PSDs can be designated "horizontal" and "vertical". The cylindrical lenses 72, 73 cause incoming light to become focused into lines. More particularly, the horizontal line of light emanating from cylindrical lens 72 is directed towards the vertically-oriented linear PSD 70, and the vertical line of light coming from cylindrical lens 73 is directed towards the horizontal PSD 71. Each PSD provides an output which indicates the position of the intersection of the line of light with the PSD. The combination of both PSDs yields information that is entirely equivalent to that obtainable with a single two-dimensional PSD. The advantage of the one-dimensional PSD is in reduced cost; two one-dimensional PSDs are substantially less expensive than one two-dimensional PSD.

The present invention has a major advantage over surface profiling techniques of the prior art, in that the present invention does not derive a conventional image of the test object. No computationally intensive or time-consuming image processing is necessary to obtain a three-dimensional surface profile. The output data stream from the apparatus of the present invention is a set of numbers, each of which can be directly converted into a point in three-dimensional space. Also, unlike conventional imaging systems which suffer the disadvantage that they can become saturated by a high-intensity signal, the present invention virtually eliminates the saturation problem because the position sensitivity of the PSD is independent of the light spot focused on it, above a certain threshold. It follows that a PSD-based system can be used to analyze a variety of surfaces, both spectral and diffuse, without the need for adjustment between tests.

The small size of the optical head used in the present invention, and the high-speed data acquisition rates, make the device useful in a wide variety of applications. For example, the invention can be used to inspect critical joints, such as lap joints in the aerospace industry. It could be used to perform pass-fail inspections of manufactured objects on an assembly line. It can be used in the field of computer vision, by providing a method of pattern recognition. It can be used to make machine tools. It can be used in the semiconductor industry for inspecting step heights and other surface characteristics of integrated circuits. It can map and track corrosion pits and damage on critical surfaces, such as the surfaces of aircraft. It could also replace mold impression techniques now employed in a variety of areas, such as in the aerospace field, or in nuclear plants.

The invention could be used in analyzing biological specimens, such as in determining the thickness of biological tissue, or measuring the protrusion of moles or lesions from the human body. It could be used in micropaleontology, such as in analysis of tiny fossil remains. In short, the present invention can be used in any area where surface topologies must be determined, or where two surfaces are to be compared, especially where speed and compactness are required.

The invention can be modified, within the scope of this disclosure. Variations in the optical equipment can be made. The computer can be programmed to display the data in various ways. Although the preferred form of radiation is coherent radiation, such as is generated by a laser, the device could also operate with non-coherent radiation, as long as the radiation is within the spectral response of the PSD, and is not limited to laser light. The optical system used in the invention can be configured in many different ways, to accommodate the needs of a particular application, and is not limited to the particular system shown in the figures. Either or both of the circuits shown in FIGS. 3 and 4 could be modified or omitted; these circuits show preferred means of practicing the invention, but the invention is not limited to use with such circuits. These and other modifications should be considered within the spirit and scope of the following claims.

What is claimed is:

1. A method of determining a contour of a test object, the method comprising the steps of:
    a) directing a beam of radiation towards a point on the object, and scattering the radiation from said point onto a location on a detector,
    b) determining said location on the detector onto which the radiation is scattered,
    c) computing a displacement of said point from a reference point based on said location, and
    d) repeating steps (a) through (c) for other points on the object, wherein each repetition of steps (a) through (c) is preceded by the step of deflecting the beam by non-mechanical means.

2. The method of claim 1, wherein the deflecting step comprises the steps of directing the beam through a crystal, while varying an index of refraction of the crystal.

3. The method of claim 2, wherein the varying step comprises directing an electromagnetic wave towards the crystal so as to induce an acoustic wave in the crystal.

4. The method of claim 1, further comprising the step of adjusting an intensity of said beam of radiation according to an intensity of the scattered radiation, wherein the intensity of the beam is reduced when the intensity of the scattered radiation increases.

5. The method of claim 1, wherein the detector is a position sensitive detector (PSD).

6. The method of claim 5, wherein the PSD is a two-dimensional PSD.

7. The method of claim 5, wherein the detector comprises two one-dimensional PSDs.

8. The method of claim 1, wherein step (d) is performed a sufficient number of times such that an area of interest on the object is scanned by the beam.

9. The method of claim 1, wherein there are two detectors, and wherein the detectors are one-dimensional position sensitive detectors (PSDs), and wherein radiation scattered from the object is directed through a pair of cylindrical lenses disposed between the object and the PSDs.

10. Apparatus for determining a contour of a test object, the apparatus comprising:
    a) means for directing a beam of radiation towards a point on the object, and for scattering the radiation from said point onto a location on a detector,
    b) means for determining said location on the detector onto which the radiation is scattered,
    c) means for computing a displacement of said point from a reference point based on said location, and
    d) non-mechanical means for deflecting the beam, wherein a plurality of points on the object can be analyzed.

11. The apparatus of claim 10, wherein the deflecting means comprises a crystal disposed in a path of the beam, and means for varying an index of refraction of the crystal.

12. The apparatus of claim 11, wherein the varying means comprises means for directing an electromagnetic wave towards the crystal so as to induce an acoustic wave in the crystal.

13. The apparatus of claim 10, further comprising means for adjusting an intensity of said beam of radiation according to an intensity of the scattered radiation, wherein the adjusting means comprises means for reducing the intensity of the beam when the intensity of the scattered radiation increases.

14. The apparatus of claim 10, wherein the detector is a position sensitive detector (PSD).

15. The apparatus of claim 14, wherein the PSD is a two-dimensional position sensitive detector.

16. The apparatus of claim 14, wherein the detector comprises a pair of one-dimensional PSDs.

17. The apparatus of claim 16, further comprising at least one cylindrical lens disposed between the object and the PSDs.

18. In an apparatus for determining a contour of a test object, the apparatus comprising means for scanning a beam of radiation along a plurality of points on the object, position sensitive detector (PSD) means for determining, for each point being scanned, a position at which radiation scattered from the object is received, and means for computing a displacement of a given point on the object by using position information obtained from the position sensitive detector means,
    the improvement wherein the scanning means comprises a non-mechanical scanning means.

19. The improvement of claim 18, wherein the scanning means comprises an acousto-optic beam deflector (AOBD) disposed between a source of radiation and the object.

20. The improvement of claim 19, further comprising means for modulating an intensity of said radiation in response to an intensity of radiation received by the position sensitive detector means, such that intensity of said radiation is reduced when an intensity of radiation received by the PSD means increases.

21. The improvement of claim 19, wherein the position sensitive detector means comprises a pair of one-dimensional position sensitive detectors (PSDs).

22. The improvement of claim 21, further comprising at least one cylindrical lens disposed between the object and the PSDs.

* * * * *